(12) United States Patent
Midtgård et al.

(10) Patent No.: US 7,124,773 B2
(45) Date of Patent: Oct. 24, 2006

(54) MEMS PILOT VALVE

(75) Inventors: Ole-Morten Midtgård, Oslo (NO); Knut Asskildt, Vollen (NO); Arne Nysveen, Trondheim (NO)

(73) Assignee: ABB Research Ltd., Zürich (CH)

( * ) Notice: Subject to any disclaimer, the term of this patent is extended or adjusted under 35 U.S.C. 154(b) by 0 days.

(21) Appl. No.: 10/516,997

(22) PCT Filed: Jun. 6, 2003

(86) PCT No.: PCT/IB03/02151

§ 371 (c)(1),
(2), (4) Date: Jun. 28, 2005

(87) PCT Pub. No.: WO03/104693

PCT Pub. Date: Dec. 18, 2003

(65) Prior Publication Data

US 2005/0257835 A1    Nov. 24, 2005

(30) Foreign Application Priority Data

Jun. 6, 2002    (NO) ................................. 20022699

(51) Int. Cl.
*F16K 31/02*    (2006.01)
(52) U.S. Cl. .............. 137/487.5; 137/375; 251/129.06; 251/331
(58) Field of Classification Search ............... 137/375, 137/487.5; 251/129.06, 331
See application file for complete search history.

(56) References Cited

U.S. PATENT DOCUMENTS

| | | | |
|---|---|---|---|
| 5,417,235 A * | 5/1995 | Wise et al. ................... 137/1 |
| 6,345,502 B1 | 2/2002 | Tai et al. | |
| 6,527,003 B1 | 3/2003 | Webster | |
| 6,557,820 B1 | 5/2003 | Wetzel et al. | |
| 6,962,170 B1 * | 11/2005 | Sherman et al. ........ 137/625.33 |
| 2001/0042801 A1 * | 11/2001 | Shouji et al. ............. 239/585.1 |

FOREIGN PATENT DOCUMENTS

WO    WO 0233268 A2    4/2002

* cited by examiner

*Primary Examiner*—Ramesh Krishnamurthy
(74) *Attorney, Agent, or Firm*—Venable LLP; Eric J. Franklin

(57) ABSTRACT

A valve including a fluid inlet and a fluid outlet coupled by a fluid channel, all of which are defined by walls and structures produced by micromachining of glass and/or silicon. An actuator can be set to at least two different positions in order to vary the flow cross section of the fluid channel. The geometries of the fluid inlet, outlet and channel are adapted for preventing the flow from changing its direction so sharply that a significant portion of contaminating droplets and or particles in the flow hit the walls of structures, as given in any arrangement according to or between the following two extremes: i) flow outlet is perpendicular to the flow inlet and the outlet dimension is larger than a critical dimension, $L_{crit}$ estimated according to a given formula and/or as simulated in a Computational Fluid Dynamics tool, and ii) flow outlet and flow channel is generally parallel to flow inlet giving a substantially unidirectional flow pattern.

9 Claims, 5 Drawing Sheets

MEMS PILOT VALVE

FIELD OF THE INVENTION

This invention is related to a valve device, in particular miniature pilot valves, realised for example in a MEMS-structure (Micro Electro-Mechanical System).

1. Field of Application

Pilot valves are typically used in pneumatic systems such as pneumatic production systems and are applied to control the pressure within large pneumatic actuators. Such actuators are used in processing equipment, for example in production processes where heavy machinery is moved or where large valves are controlled.

Such pilot valves are often referred to as IP regulators, having an electrical (I for current) input and a pneumatic (P for pressure) output such that an analogue electrical signal generates a proportional corresponding pneumatic pressure at the output when the input is supplied with air from a supply unit, e.g. a compressor, with a largely constant high pressure.

2. Prior Art

Among a multitude of commercially available IP regulators is the TEIP 11 signal converter produced by ABB [1], for converting a standard electrical input signal to a standard pneumatic pressure output, e.g. a 4–20 mA current into a 0.2–1 bar pneumatic output signal.

Even though large pneumatic compressor based plants almost always are equipped with filter units in order to protect the equipment using the compressed air, and the equipment itself is also equipped with filter units, it is known that the correct operation these devices may often be limited by clogging of thin air channels by the deposition of films on surfaces exposed to the pressurised air. Also, movable parts may permanently stick to other parts within the device and render a useless unit. Such deposits build up during operation and eventually disturb the correct functioning or even destroy components, creating a requirement for replacing such units. Such an effect limits the operational time and increases the maintenance costs of systems using such devices. Because IP regulators in this way are directly exposed to the fluid flow and their correct operation may be critical to the correct operation of the system, such regulators are in most cases simply discharged and replaced by new devices when such problems are suspected.

OBJECTS OF THE INVENTION

It is thus an object of the present invention to provide valves that have increased tolerance to the presence of contamination in the supply air.

It is also an object of the invention to provide pilot valves that have a longer effective operating life in a fluid flow of pressurised air, possibly contaminated by impurities or droplets.

Further it is a particular object of the invention to provide miniature pilot valves in which contamination, particularly in the form of a mixture of oils and particles, passes more easily through the valve without sticking to the surfaces, thereby creating a damaging sticky film on the inside of the valves.

SUMMARY OF THE INVENTION

The objects of the invention are obtained with a valve as described herein.

Further preferred examples of the invention are evident from the accompanying description and appended figures.

DETAILED DESCRIPTION OF THE INVENTION

Figure 1A:
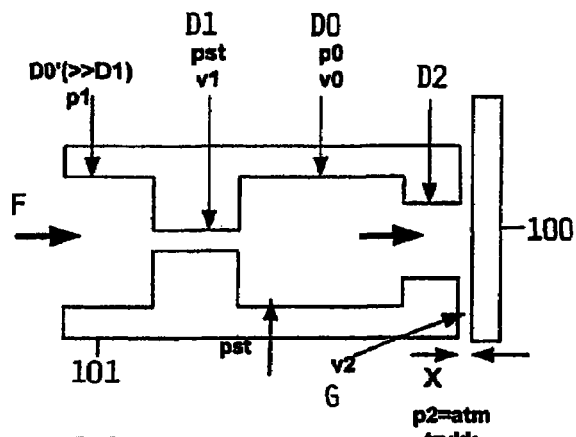
FIG. 1A Illustrates the critical flow outlets of one IP regulator representing prior art.

A more detailed explanation illustrating the limitations of typical prior art technology is given in the following with reference to FIGS. 1–3. FIG. 1A shows an air flow F with water/oil/particle contamination flowing through the outlet parts of a typical IP-pilot valve. The first restriction or nozzle D1 encountered is fixed, in this case with a transverse dimension of 0.25 mm. Even though this nozzle is relatively narrow, it doesn't normally constitute a problem regarding build-up of deposits on critical parts of the IP-valve from the contaminated supply air. The second restriction D2 is at the outlet between the flapper 100 and the valve body 101 with a gap of variable width X, as indicated. The gap width X is varied by applying a force 102 on the flap arm 103, causing the flapper arm 103 to rotate a small angle around its point of rotation 104. X is typically very small, in the region of 10–40 μm. When x is varied the air flow and thereby the pressure, $p_{st}$ varies accordingly. This pressure can feed a following "booster" or air amplifier (not illustrated). The air amplifier then delivers an air flow with a pressure and a rate of flow sufficient to control large pneumatic actuators etc.

Figure 1B:
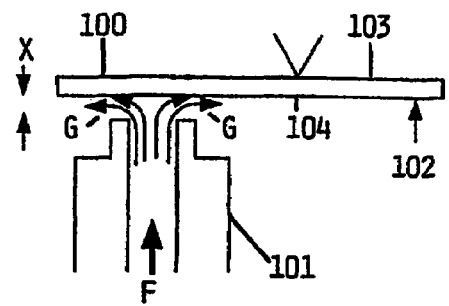
FIG. 1B Illustrates the critical flow outlets of a second IP regulator representing prior art.

FIG. 1B illustrates how the air and particle flow pass the circular valve body 101 of transverse dimension D2 before leaving the outlet to atmosphere at right angles through a gap of variable width X.

Figure 2:
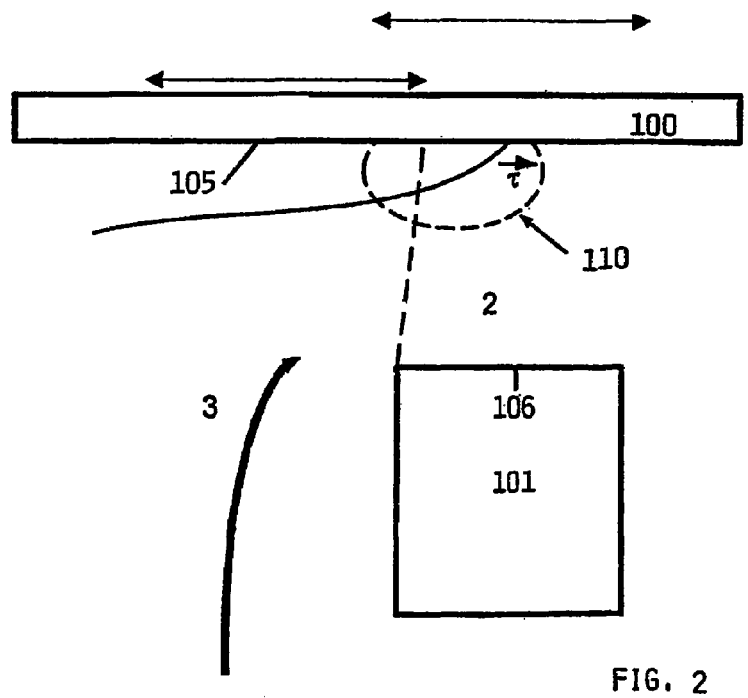
FIG. 2 Illustrates some possible mechanisms involved in the build-up of film or layers near the valve outlets.

FIG. 2 illustrates a few possible mechanisms that may be involved in the rather complex processes that are significant to the build-up of films or layers in the critical regions 110 around the flapper 100 and the outlet 2. A frequent fault appearing in such valves is the deposition of layers 105 on the seat of the valve 106 and/or the flapper 100, such that the flapper 100 sticks to the valve seat 106 when touching or being close to this. Often, neither the regulating force 102 nor the pressure forces will be sufficiently large in order to loosen the flapper 100 from the valve seat 106. A sticky flapper 100 thus renders the whole IP regulator useless, and resulting in the replacement of the whole IP regulator with a new. The faulty IP regulator is often merely discarded due to this failure.

It is worth noticing that many years of experience in producing and using such IP regulators have shown that the nozzle D1 does not pose such problems, while the flapper parts 100,103 are severely subject to such problematic effects.

The above is consistent with computational fluid dynamics simulations made in our laboratory. Such simulations have shown that the majority of the particles in the air flow hit the flapper 100 in the critical regions 110 while very few hit the thin channel of the D1-nozzle, as illustrated in FIG. 3.

Figure 3A:
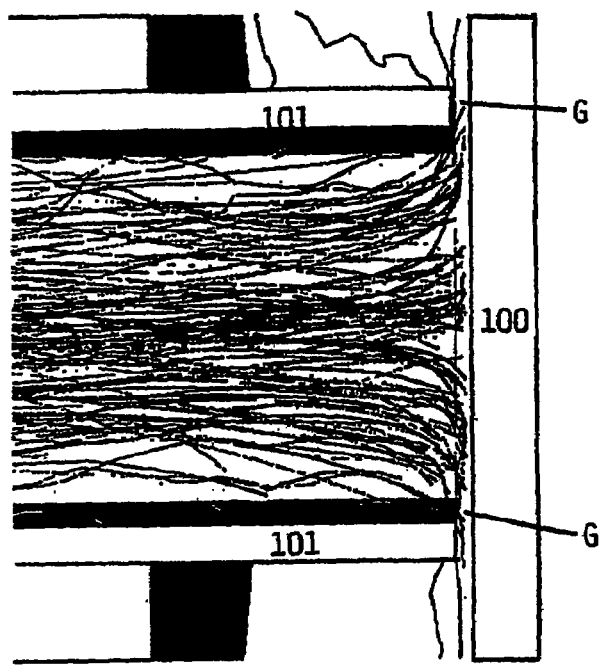
FIG. 3A Illustrates a computational fluid dynamics simulations of the particle transport in the valve of FIG. 1B.

FIG. 3A shows the result of a computational fluid dynamics (CFD) simulation illustrating how the particles of the fluid move horizontally with the flow from the left to the right and out to free atmosphere vertically through the small gap G between the valve body 101 and the flapper 100. This diagram corresponds to the valve of FIG. 1B.

Figure 3B:
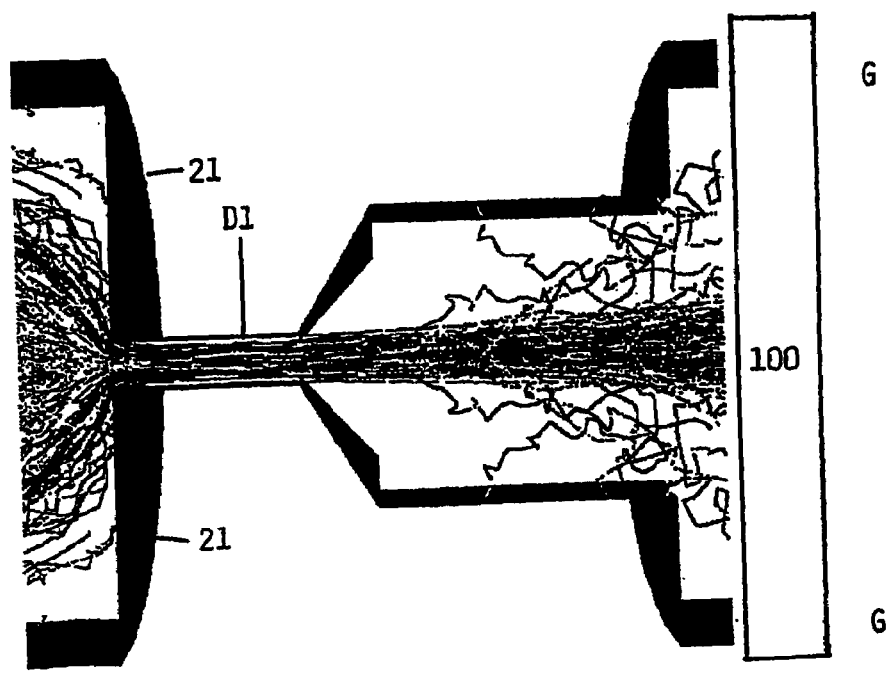
FIG. 3B Illustrates a computational fluid dynamics simulations of the particle transport in the valve of FIG. 1A.

FIG. 3B illustrates how the particles move with the flow through the valve of FIG. 1A. The particles move smoothly through the nozzle of transverse dimension D1. The particles of the simulations vary in size between 1.8 and 20 μm and the simulations are set-up so that particles hitting a wall stops at the hit point and do not continue following the flow. It can be seen that very few particles manage to get through the flapper gap G, while almost all particles pass through the nozzle D1 without hitting a wall. In the nozzle D1 some particles hit the vertical wall 21 prior to entering the nozzle channel D1, however, this is not a very critical region. All air in the flow is assumed to be produced by a compressor with at least an (double) air filter and the simulated IP regulator has a fairly good filter at its entrance.

Even though filters are often used in connection with such valves in order to stop particles from entering the valve, such filters will typically pass particles of a small dimension. It is a main feature of this invention that the fluid flow channels of the valve are designed such that the typical particles entering the valve are allowed to follow curves in such a way that the particles do not hit the walls of the device. This is determined mainly by the flow velocity, the size of the particles and the difference in density between the fluid and the particles as well as the geometry of the device.

Figure 4:
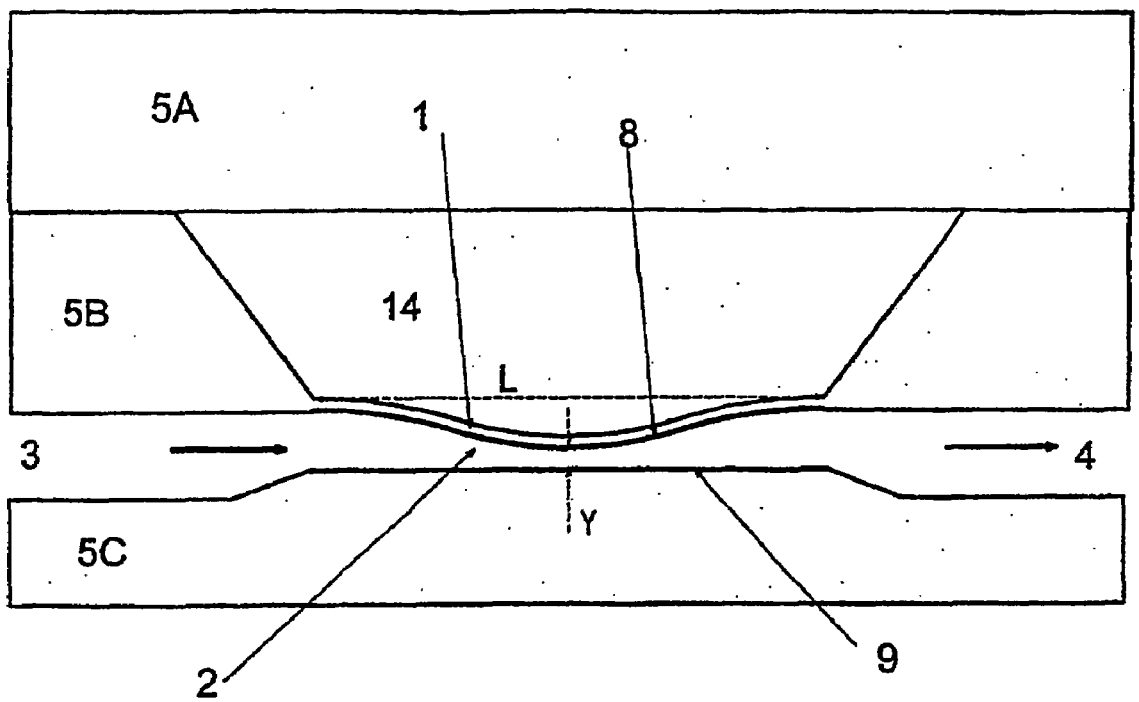
FIG. 4 Illustrates the active part of an example of a MEMS-based IP regulator according to the invention with a deflected membrane.

A first embodiment of a MEMS-valve according to the invention, in particular for e.g. a pilot valve in an IP-regulator, is illustrated in FIG. 4. The valve comprises comprising a fluid inlet 3 and a fluid outlet 4 coupled by a fluid channel 2, all of which being defined by walls and structures 5 produced by micromachining of glass and or silicon. The valve also comprises an actuator 1,8,9 which can be set to at least at two different positions in order to vary the flow cross section of the fluid channel 2. The geometries of the fluid inlet, outlet and channel are adapted for preventing the flow from changing its direction so sharply that a significant portion of contaminating droplets and or particles in the flow hit the walls of structures, as given in any arrangement where the flow outlet and flow channel is generally parallel to flow inlet giving a substantially unidirectional flow pattern.

The fluid channel 2 couples the fluid inlet 3 and the fluid outlet 4. This embodiment of the invention is close to the ideal solution in that the fluid flow typically has very large radius of curvature. The fluid channel 2 can be choked by bending the non-rigid membrane 1 with an electrostatic, thermal or piezoelectric actuator, thereby changing the internal cross section Y of the fluid channel. In FIG. 4 an electrostatic actuator has one electrode 9 of the actuator situated on the surface of the bottom plate 5C facing the fluid channel 1 and the other electrode 8 is situated underneath the membrane 1. The force exerted by the actuator is given by control means (not illustrated) that are electrically coupled to the actuator 1,8,9.

This first embodiment of the invention can be realised in a so-called triple stack MEMS process. A middle plate 5B, preferably made of silicon, is sealed between a top plate 5A, preferably made of glass, and a bottom plate 5C, preferably also made of glass. The plates can be sealed using anodic bonding. In all three plates it is possible to etch ducts and channels for the transport of supply air and output air, and possibly also supplementary channels. On the surface of the bottom plate 5C facing the fluid channel 2 there is arranged a first conducting electrode 9, preferably a metal electrode, possibly protected from the fluid flow by a protective layer on top of the electrode. On one side of the membrane 1 there is a second thin conducting electrode 8, either a metal layer or a highly doped region of the non-rigid silicon membrane 1, situated on the surface of the membrane 1 facing the channel 2 and is preferably also protected by a thin protective layer, preferably a silicon oxide layer. The silicon membrane 1 is an integrated part of the middle plate 5B, preferably etched out from a single piece of silicon material. Typically, the membrane has a length and width of the order of 200 μm, while the cross section Y of the channel is typically of the order of 20 μm, yielding Y<<L. The metal and possibly semiconductor electrodes 8,9 are connected to an electric charging unit (not shown). If the electrodes 8,9 are charged with electric charges of opposite sign, an attractive force between the electrodes 8,9 results, thereby pulling the membrane 1 towards the bottom plate 5C. In this way, a reduction in the cross section or cross sectional dimension Y of the fluid channel 2 is obtained, resulting in a reduced flow through the device.

In front of, that is to the left of, the structure shown in FIG. 4 there will be a nozzle of constant diameter D1 as shown in FIG. 1. Such a nozzle can easily be produced as an integrated part of the triple-stack structure shown in FIG. 4. The control pressure between the D1 nozzle and the variable cross section valve is led to a booster device, which will then amplify or boost the control pressure and fluid flow to a level suitable for large pneumatic actuators. This control pressure is regulated by supplying a suitable charge to the actuator electrodes 8,9 and thereby giving the membrane 1 a suitable deflection.

Figure 5:
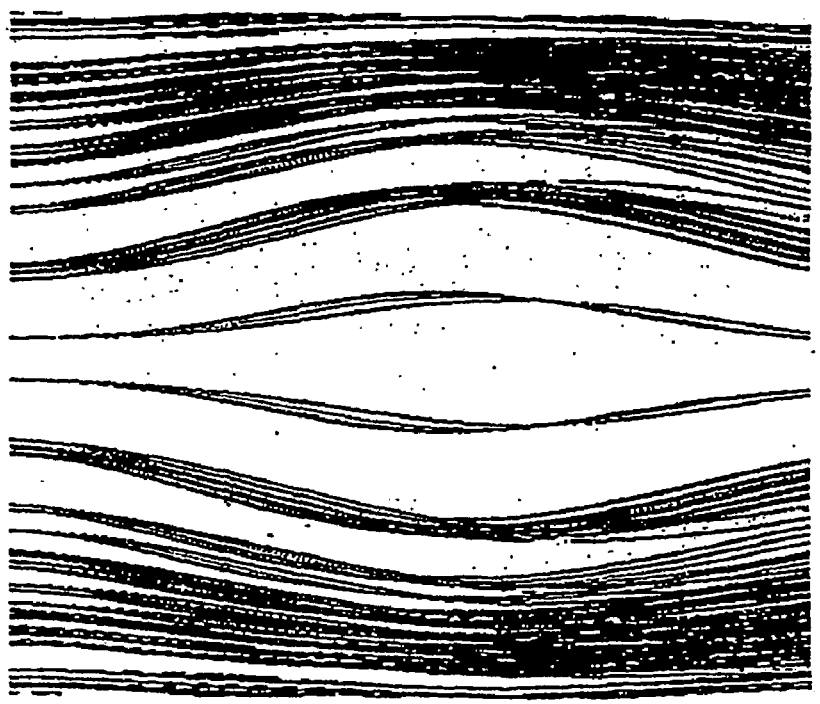
FIG. 5 Illustrates a computational fluid dynamics simulations of the particle flow in a regulator according to the valve of FIG. 4.

This first embodiment of the invention achieves the highly desirable feature of a very high fluid flow radius of curvature, thereby yielding a minimum of particles hitting and adhering to the internal walls of the fluid channels, particularly in the channel. This is confirmed by the computational fluid dynamics (CFD) simulation of FIG. 5 illustrating the typical particle trajectories to be expected below a deflected membrane as illustrated in FIG. 4. FIG. 5 illustrates how the particle trajectories appear in the fluid channel 2 between the membrane 1 and the bottom plate 5C, as seen in a direction normal to the bottom plate 5C. The rectangular membrane 1 has the highest deflection in the middle thereby defining the thinnest portion of the fluid channel 2. Accordingly, the fluid flow is distributed as shown in FIG. 5, with the few particles in the middle of the fluid channel 2. From FIG. 5 it can be seen that no particles hit the wall of the fluid channel 2. Hence, the structure of FIG. 4 is regarded as near ideal concerning particle contamination of the walls of the structure.

A potential disadvantage of the electrostatic actuation as described above is that there will be an electric field across the fluid channel. If this field is directed one way only, that is always with the same polarity of the electrodes, charged or polarized particles in the fluid flow will tend to be attracted to the wall of the fluid channel 2, thereby contributing to undesired deposits. The high velocity of the flow as well as other factors may contribute to a charging of particles in the flow.

An electrostatic force between the electrodes is attractive irrespective the field direction. Hence the electrodes 8,9 may be driven by an alternating current/voltage that reverses the field between the electrodes 8,9 periodically. Preferably, the alternating frequency is significantly larger than the frequency of the fundamental resonance of the membrane, which is typically in the range of 10–50 kHz for our applications. For setting up such an AC drive signal for the electrodes 8,9 a suitable AC generator or AC drive circuitry (not illustrated) will have to be used. Such generators are well known to anyone skilled in the art.

It is anticipated that such a high-frequency field contributes to a self-cleaning effect in the fluid channel 2, in that deposits are torn off the surfaces by a high-frequency actuator drive signal and flushed out of the device with the flow without affecting the primary function of the device.

The cavity 14 formed behind the membrane 1 when being micro-machined from the silicon middle plate 5B by etching, requires a reference pressure suitable for regulating the membrane deflection. Unless the pressure in the cavity 14 of FIG. 4 is adjusted in some manner according to the varying pressure differences between the cavity 14 and the fluid channel 2, fairly large actuator forces will in some situations be required to achieve the required deflection. Typically, the electrode voltage is limited to around 200 V, above which dielectric breakdown in the dielectric between the electrodes 8,9 will occur.

Figure 6:
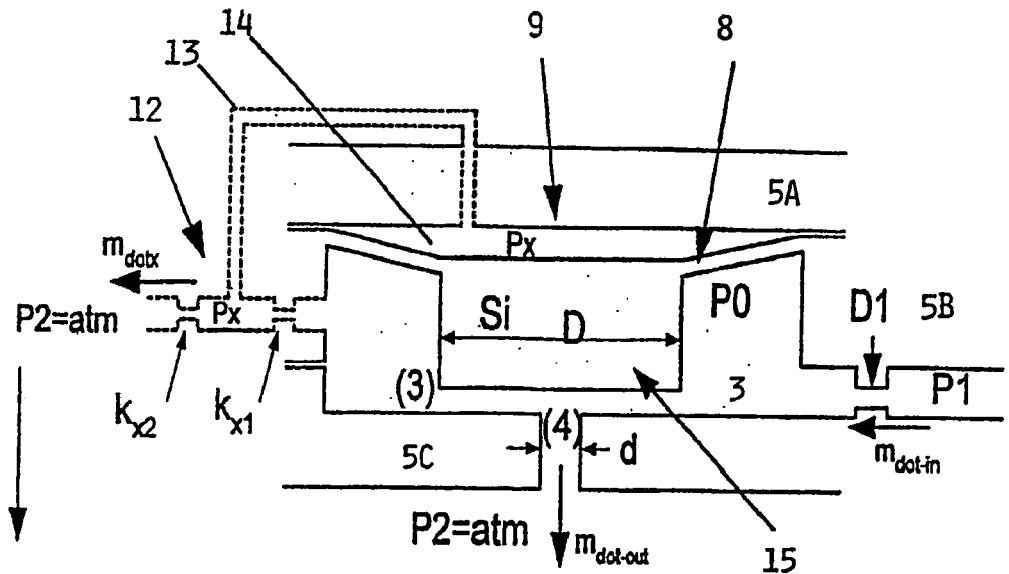
FIG. 6 Illustrates another embodiment of a MEMS-based IP regulator according to the invention.

In a second embodiment according to the invention there is provided a MEMS-valve, for e.g. a pilot valve in an IP-regulator, as illustrated in FIG. 6. The valve comprises a fluid inlet 3, a fluid channel 2, and a fluid outlet 4. The fluid channel 2 couples the fluid inlet 3 and the fluid outlet 4. In this case, unlike in the above explained first embodiment, the fluid outlet 4 is arranged to be substantially perpendicular to the fluid inlet 3.

In this second embodiment of the invention the fluid channel 2 has an actuator in the form of a bendable membrane 1, preferably micro-machined in silicon. The membrane 1 and the associated valve boss 15 can be forced to move, e.g. by an electrostatic, a thermal or piezo-electric actuator, thereby changing the internal cross section or cross sectional dimension of the fluid channel. By bending the silicon membrane the fluid channel cross section can be reduced in size, thereby providing a pressure drop between the fluid inlet 3 and fluid outlet 4. The actuator force is at least partly controlled by channel control means that are electrically connected to the actuator.

Figure 7:
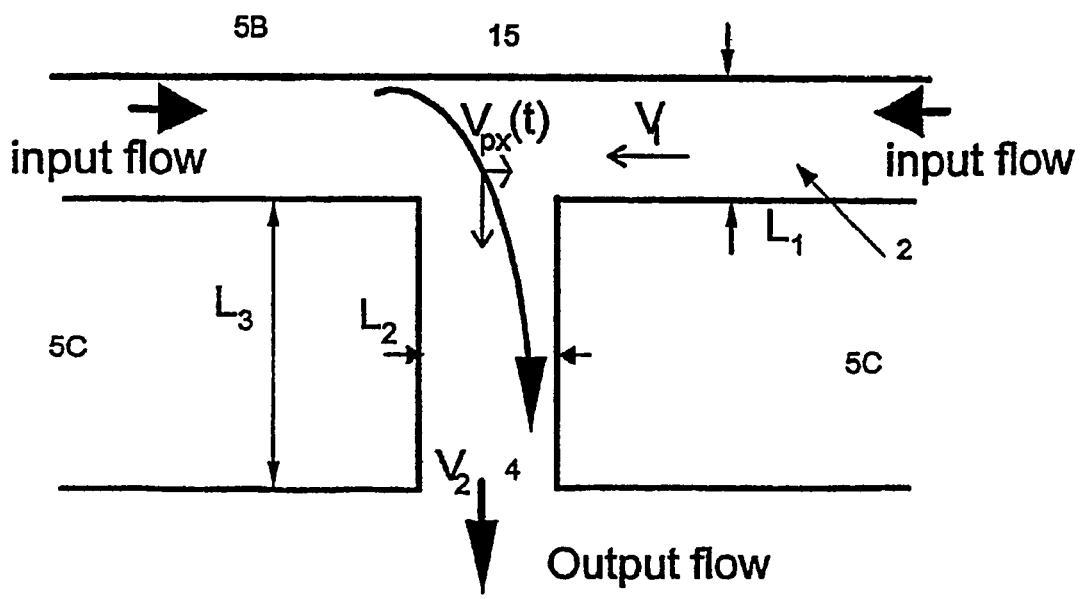
FIG. 7 Illustrates schematically a 90° bend between the fluid input and the fluid output.

The structure and geometrical design of the MEMS-valve is adapted for high tolerance to impurities in the fluid supplied to the device in that the transverse dimension of the fluid outlet 4 is increased, depending on the density, size, and velocity of the particles or droplets in the flow, such that almost all particles or droplets follow the flow around the corner without hitting an inside wall of the valve. Increasing the transverse dimension of the fluid outlet 4 provides a significant improvement as compared to prior art technology. Letting the transverse dimension or cross sectional dimension of the fluid outlet 4 be larger than a limiting value determined by the characteristics of the fluid, the fluid inlet 3 and the particles or droplets it has been found by simulation that the number of particles or droplets hitting the internal walls is highly reduced. Referring to FIG. 7, the limiting value is given by $$L_{crit} = \frac{V_1 \cdot \rho_f \cdot m}{3 \cdot \pi \cdot \mu_f \cdot \Delta\rho \cdot d}$$

where typical values can be:

$V_1 = 200$ m/s $\rho_f = 1.2$ kg/m$^3$ $\Delta\rho = 2.5 \times 10^{-3}$ kg/m$^3$ $\mu_f = 18 \times 10^{-6}$ Ns/m$^2$ $d = 20 \times 10^{-6}$ m $V_1$ is the mean flow velocity at the output of the input flow channel, $\rho_f$ is the density of the fluid, m is the mass of the particles or droplets, $\mu_f$ is the viscosity of the fluid, $\Delta\rho$ is the difference in the density of the particle or droplet material and the fluid material, and d is the typical diameter of the particles or droplets.

The mass of the particles is given by $$m = \frac{4}{3} \cdot \pi \cdot \left(\frac{d}{2}\right)^2 \cdot (\rho_f + \Delta\rho).$$

A schematic of the critical area is shown schematically in FIG. 7, showing the main parameters of the geometrical design. $L_1$ is the transverse dimension of the fluid channel 2, $L_2$ is the transverse dimension of the fluid outlet 4. Under certain assumptions and given the geometry and the mean flow velocity at the outlet of the fluid channel 2, the velocity at the fluid outlet 4 is given by $$V_2(L_2) = \frac{L_1 \cdot L_2 \cdot 4}{L_2^2} \cdot V_1$$

The following equation can be derived to express a dependence of the path of the particle or droplet on the transverse dimension of the fluid outlet 4:

$$f(L_2) = \frac{V_1 \cdot \rho_f \cdot m}{3 \cdot \pi \cdot \mu_f \cdot \Delta\rho \cdot L_2}\left[1 - e^{\frac{3 \cdot \pi \cdot \mu_f \cdot \Delta\rho \cdot (L_1 + L_3) \cdot L_2}{2 \cdot \rho_f \cdot m \cdot V_1 \cdot L_1}}\right]$$

where $L_3$ is the length of the fluid outlet 4. Typical values of $L_1$ and $L_3$ can be $L_1 = 20 \times 10^{-6}$ m $L_3 = 500 \times 10^{-6}$ m When $f(L_2) > 1$, the particles will hit the internal wall of the fluid outlet 4. When $f(L_2) < 1$, the particles will leave the fluid outlet 4 without hitting the wall. A limiting value is thus defined by $L_2 > x_{p\ max}$, As long as $$x_{p\,max} = \frac{V_1 \cdot \rho_f \cdot m}{3 \cdot \pi \cdot \mu_f \cdot \Delta\rho \cdot d}$$

no particles will hit the walls of the fluid outlet.

This equation can be regarded as a constructional rule or design rule to be used in order to achieve high resistance to deposition of oil/particles on the walls of the channels.

Figure 8:
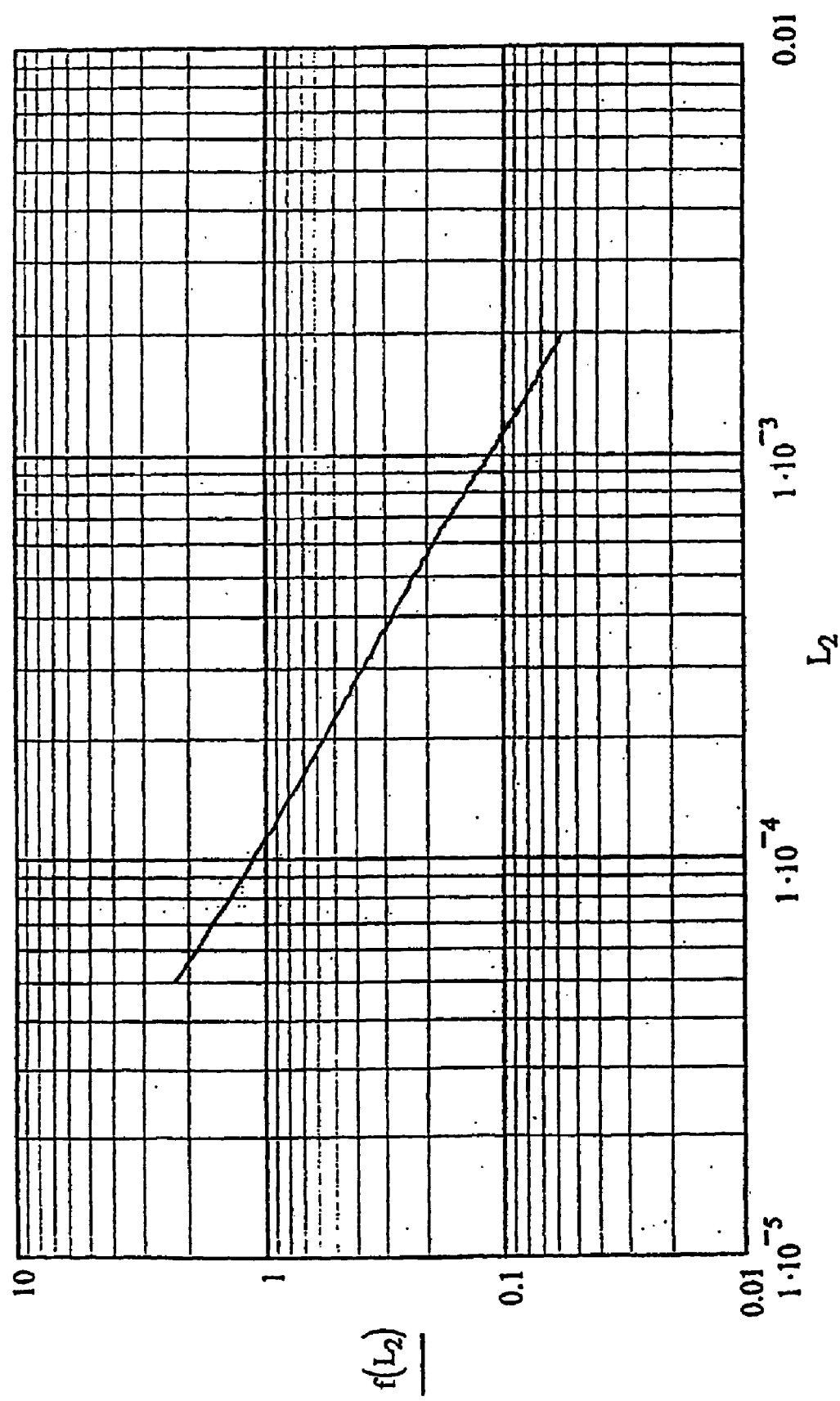
FIG. 8 Illustrates the constructional rules or design rules to be used in order to achieve high resistance to deposition for 90° bend structures.

FIG. 8 illustrates typically how $f(L_2)$ depends on $L_2$. From the diagram of FIG. 8 it can be seen that in order for $f(L_2)$ to become less than 1, $L_2$ should be designed to be larger than 300 µm in this case. In practice one would take this as a first estimate and perform a more accurate fluid dynamics simulation with a particle transport model incorporated to find a more accurate value for $L_2$.

The structures of FIGS. 4 and 6 may seem as extreme examples of the more general case where inlet and outlet paths constitute an arbitrary angle and are connected by a channel of controllable cross sectional area. For the general case a design rule similar to the one for a structure in FIG. 6 can be established.

The structure of FIG. 6 is preferably also realised in the same triple stack MEMS-process as mentioned above. The fluid flow enters the device with a pressure $P_1$ from the right in the diagram of FIG. 6, passing through the nozzle $D_1$ prior to entering the fluid channel inlet 3. The pressure, $P_0$, of the cavity to the left of the nozzle $D_1$, is the pressure that is being led to the booster. The membrane 1 in this case has a "valve boss" 15 in its centre. The volume between the valve boss 15 and the bottom plate 5C defines the active part of the fluid channel 2 which can be regulated. The first electrode 8 of the actuator is preferably arranged on the upper side of the membrane 1, i.e. on the side of the membrane facing away from the fluid channel 2. This electrode is thus not directly exposed to the wear of the flowing fluid. The second electrode 9 of the actuator is preferably arranged on the lower side of the upper glass plate 5A. In this way the two electrodes can be used to set up an electric field within the cavity 14 formed between the membrane 1 and the upper glass plate 5A.

This construction has several advantages. A first advantage is that the actuator works over the full extension of the membrane 1, while the pressure drop is located to the extension of the valve boss 15 only. This reduces the requirement for actuator force to achieve a given pressure drop.

Another significant advantage is that the electric field of the actuator no longer extends into the fluid channel 2, and the electric field therefore will not contribute to the formation of undesired deposits or films in the fluid channel 2. On the other hand, it will not be possible to obtain the self-cleaning effect described above.

In order to reduce the maximum voltage needed to achieve the specified deflection of the membrane 1, pneumatic feedback means 12,13,14, as shown in FIG. 6, can be provided. The feedback means comprises a fluid connection 13 between the fluid channel 2 and the cavity 14 on one side of the membrane 1. The feedback means 12,13,14 ensures that a certain part of the pressure from the high pressure side of the MEMS-channel 2,3,4 is fed back to the cavity 14 in order to reduce the pressure difference between the cavity 14 and the channel 2,3,4, and correspondingly reduces the voltage required for the actuator. Channels with restrictions $k_{x1}$ and $k_{x2}$ are shown by dotted lines. The pressure drop over the restrictions can be defined by choosing $k_{x1}$ and $k_{x2}$, such that the feedback pressure $P_x$ takes a value which optimizes a balance of the forces due to the pressure, the spring force of the membrane and the electrostatic forces of the actuator. Such a feedback arrangement is may also be applicable to the embodiment of FIG. 4.

To further to reduce the build-up of particle deposits all sharp corners of the fluid channels 2, specifically those at the entrance of the fluid channel 2 under a boss of the valve 15 can be rounded to avoid large flow gradients and corresponding contamination problems on the walls just after any corners, e.g. by suitable etching procedures during the MEMS fabrication.

Yet another improvement to reduce the build-up of particle deposits is to provide a thin (nanotechnological) layer on all fluid channel walls of the device to achieve hydrofobic and oleofobic surfaces. This causes water and oil based particles, droplets or even vapour in the case of condensation to be repelled by the internal walls of the device.

The valve may also comprise thermal or piezoelectric actuator means that could be arranged separated from or in combination with the above described electrostatic actuator in order to achieve improved functioning of the device, for example to provide improved means for controlling the bending of a membrane based actuator.

REFERENCES

[1] ABB product datasheet for TEIP 11, "I/P Signal Converter For Standard Signals", 10/99, from ABB Automation Products GmbH, Minden, Fed. Rep. of Germany (http:/www.abb.de/automation)
[2] "Electrically-activated, normally closed diaphragm valves", by Hal Jerman, in J. Micromech. Microeng. Vol. 4, (1994) pp 210–216, IOP publishing, UK, 1994.

The invention claimed is:

1. A valve, realised in a MEMS-structure, comprising a fluid inlet and a fluid outlet coupled by a fluid channel, all of which being defined by walls and structures produced by micromachining of glass and or silicon, and an actuator which can be set to at least at two different positions in order to vary the flow cross section of the fluid channel, wherein the geometries of the fluid inlet, outlet and channel are adapted for preventing the flow from changing its direction so sharply that a significant portion of contaminating droplets and or particles in the flow hit the walls of structures, as given in any arrangement according to or between the following two extremes:
   i) flow outlet is perpendicular to the flow inlet and the outlet dimension is larger than a critical dimension, $L_{crit}$ estimated according to:

$$L_{crit} = \frac{V_1 \cdot \rho_f \cdot m}{3 \cdot \pi \cdot \mu_f \cdot \Delta\rho \cdot d}$$

where $V_1$ is the mean flow velocity at the output of the input flow channel, $\rho_f$ is the density of the fluid, m is the mass of the particles or droplets, $\mu_f$ is the viscosity of the fluid, $\Delta\rho$ is the difference in the density of the particle or droplet material and the fluid material, d is the typical diameter of the particles or droplets, and m is the mass of the particles, or as simulated in a Computational Fluid Dynamics tool,
   i) flow outlet and flow channel is generally parallel to flow inlet giving a substantially unidirectional flow pattern.

2. The valve according to claim 1, further comprising a non-rigid membrane arranged in the fluid channel.

3. The valve according to claim 2, further comprising an electrostatic actuator with a first electrode on the side of the membrane facing the fluid channel and a second electrode on the inside of the channel opposite to the membrane, whereby changing the voltage on the actuator will change the channel cross section.

4. The valve according to claim 1, further comprising an electrostatic actuator with a first electrode on the side of the membrane facing away from the fluid channel and a second electrode on a flat surface facing the first electrode, forming a cavity between the electrodes over which the electric field of the actuator is acting, thus avoiding a field across the fluid channel that may otherwise direct particles in the flow towards the walls of the channel.

5. The valve according to claim 3, wherein AC voltages are applied to the actuator to set up vibrations of suitable frequency in the membrane whereby the vibrations cause particles or layers attached to the membrane to loosen and be flushed out of the device by the fluid flow.

6. The valve according to claim 1, further comprising pneumatic feedback means for reducing the pressure difference between each side of the membrane.

7. The valve according to claim 6, wherein the pneumatic feedback means comprises a fluid connection between the fluid channel and a cavity on one side of the membrane.

8. The valve according to claim 1, wherein all sharp corners of the fluid channels at the entrance of the fluid channel under a boss of the valve, are rounded to avoid large flow gradients and corresponding contamination problems on the walls just after any corners, by suitable etching procedures during the MEMS fabrication.

9. The valve according to claim 1, further comprising a thin layer on all fluid channel walls of the device to achieve hydrophobic and oleophobic surfaces to repel water and oil based particles, droplets or even vapor in the case of condensation can take place.

* * * * *